(12) United States Patent
Lee et al.

(10) Patent No.: US 8,189,346 B2
(45) Date of Patent: May 29, 2012

(54) SECURING DEVICE, AND ASSEMBLY OF AN ELECTRONIC DEVICE AND THE SECURING DEVICE

(75) Inventors: Tung-Ping Lee, Hsichih (TW); Yu-Ling Kuo, Hsichih (TW)

(73) Assignee: Wistron Corportion, Taipei Hsien (TW)

( * ) Notice: Subject to any disclaimer, the term of this patent is extended or adjusted under 35 U.S.C. 154(b) by 308 days.

(21) Appl. No.: 12/629,492

(22) Filed: Dec. 2, 2009

(65) Prior Publication Data
US 2010/0142159 A1 Jun. 10, 2010

(30) Foreign Application Priority Data

Dec. 9, 2008 (TW) ............................... 97222065 U

(51) Int. Cl.
*H05K 7/14* (2006.01)
*H05K 7/18* (2006.01)
(52) U.S. Cl. .................... 361/801; 361/807; 361/810
(58) Field of Classification Search .......... 361/801–803, 361/807, 810, 715, 727, 756, 686
See application file for complete search history.

(56) References Cited

U.S. PATENT DOCUMENTS

| 7,508,660 | B2* | 3/2009 | Lin | 361/679.33 |
| 7,646,613 | B2* | 1/2010 | Ligtenberg et al. | 361/801 |
| 2005/0157463 | A1* | 7/2005 | Hsu | 361/685 |
| 2010/0277875 | A1* | 11/2010 | Moorehead et al. | 361/747 |

* cited by examiner

*Primary Examiner* — Hung S Bui
(74) *Attorney, Agent, or Firm* — Steptoe & Johnson LLP

(57) ABSTRACT

In an assembly of an electronic device having one side provided with at least one securing hole, and a securing device including a body, an abutting and retaining member, and a guiding unit, the body includes a base for placement of the electronic device thereon, and a lateral plate extending upwardly from one side of the base and having an inner side formed with at least one protrusion for engaging the securing hole. The abutting and retaining member is movably and slidably disposed on the base opposite to the lateral plate. The guiding unit is connected to the abutting and retaining member and the base for guiding displacement of the abutting and retaining member so that the latter is rotatable relative to the base to abut against the other side of the electronic device when being displaced from a release position to a securing position.

15 Claims, 6 Drawing Sheets

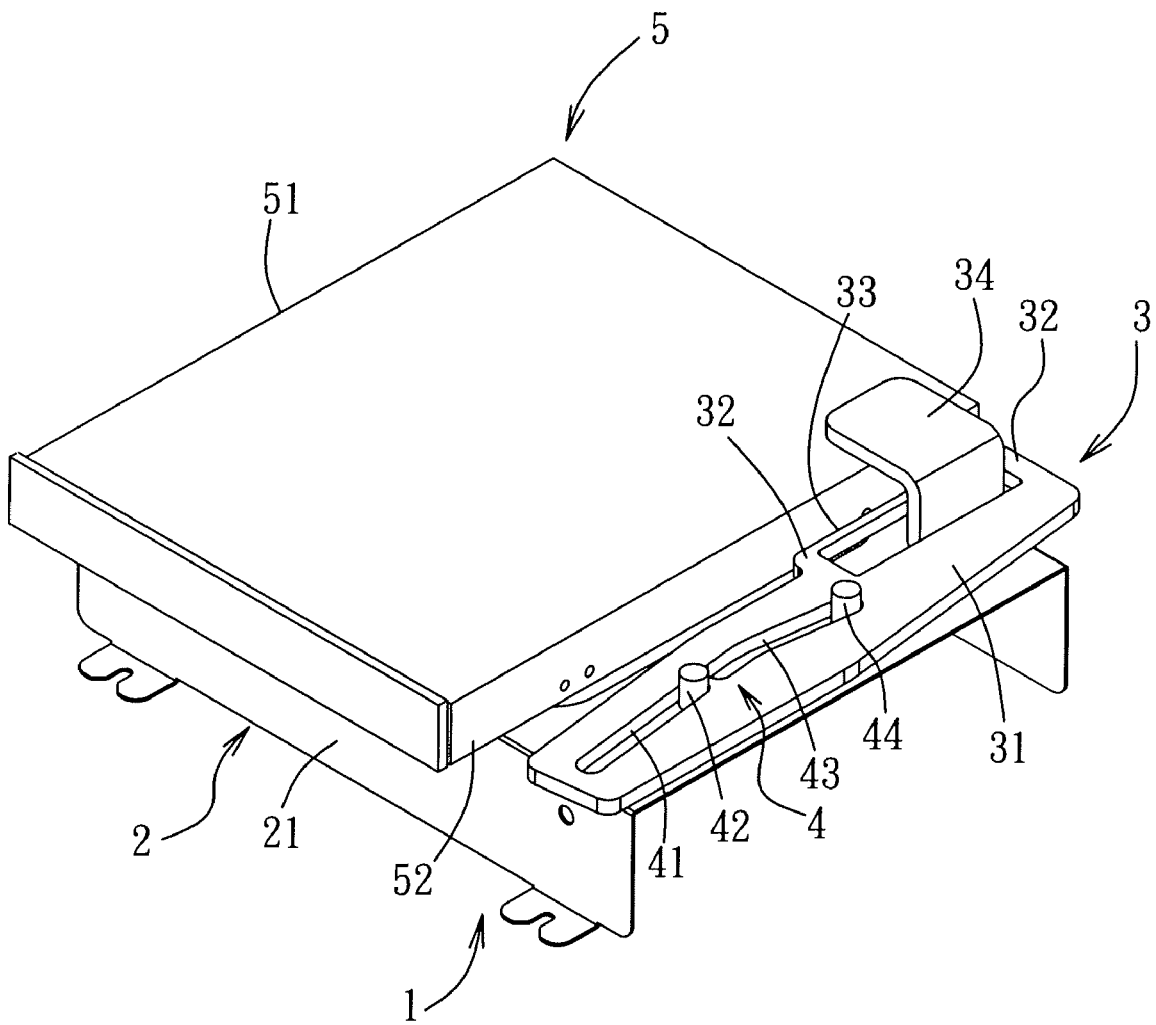
F I G. 1

SECURING DEVICE, AND ASSEMBLY OF AN ELECTRONIC DEVICE AND THE SECURING DEVICE

CROSS-REFERENCE TO RELATED APPLICATION

This application claims priority of Taiwanese Application No. 097222065, filed on Dec. 9, 2008.

BACKGROUND OF THE INVENTION

1. Field of the Invention

The invention relates to a securing device, more particularly to a securing device that permits an electronic device to be removably mounted thereon.

2. Description of the Related Art

A computer device generally has a data storage device, such as a hard disk, an optical disk drive, etc. Generally, in order that the data storage device can be removably mounted to a frame, the data storage device is usually locked to the frame using screws. Thus, removal of the data storage device from the frame will take a relatively long time and require use of an additional tool (e.g., a screwdriver).

In order to shorten the time required to remove the data storage device, there are available on the market data storage devices that do not require use of screws or tools and that provide ease of removal. One such device is disclosed in Taiwanese Utility Model No. M335768, which utilizes a resilient arm to enable a pin to be inserted into or removed from a securing hole in an object (e.g., a storage device) such that the object is removable from a box body.

SUMMARY OF THE INVENTION

Therefore, an object of the present invention is to provide a securing device that has a simple structure and that is easy to operate.

Another object of the present invention is to provide an assembly of a securing device that has a simple structure and that is easy to operate, and an electronic device mounted on the securing device.

Accordingly, the assembly of the present invention includes an electronic device and a securing device. The electronic device has one side provided with at least one securing hole. The securing device includes a body, an abutting and retaining member, and a guiding unit. The body includes a base for placement of the electronic device thereon, and a lateral plate extending upwardly from one side of the base and having an inner side formed with at least one protrusion that corresponds to the securing hole in number. The side of the electronic device with the at least one securing hole is brought to abut against the lateral plate to permit engagement between the at least one protrusion and the at least one securing hole. The abutting and retaining member is movably and slidably disposed on an upper surface of the base, and is located at the other side of the electronic device opposite to the lateral plate. The guiding unit is connected to the abutting and retaining member and the base, and guides displacement of the abutting and retaining member such that the abutting and retaining member is rotatable relative to the base to be partially close to the electronic device and to abut against the other side of the electronic device that is opposite to the one side with the at least one securing hole when the abutting and retaining member is displaced from a release position to a securing position.

Preferably, the guiding unit includes a first guide slot formed in one of the base and the abutting and retaining member, a first guide post formed on the other of the base and the abutting and retaining member and slidable along the first guide slot, a second guide slot formed in one of the base and the abutting and retaining member, and a second guide post formed on the other of the base and the abutting and retaining member and slidable along the second guide slot. The first guide slot extends along a direction that forms an acute angle with a direction of extension of the second guide slot. In an embodiment of the present invention, the first and second guide slots are not intercommunicated. In another embodiment of the present invention, the first and second guide slots are intercommunicated.

The advantageous effect of the present invention resides in that, by virtue of the configuration of the abutting and retaining member which has a part thereof brought into close proximity to the electronic device and which abuts against the side of the electronic device that is opposite to the side with the securing hole when guided to displace from the release position to the securing position by the guiding unit, the electronic device can be secured with the use of a simple structure that is easy to manipulate.

BRIEF DESCRIPTION OF THE DRAWINGS

Other features and advantages of the present invention will become apparent in the following detailed description of the preferred embodiments with reference to the accompanying drawings, of which:

FIG. 1 is a perspective view to illustrate how an electronic device is mounted on the first preferred embodiment of a securing device according to the present invention when an abutting and retaining member of the first preferred embodiment is at a securing position;

DETAILED DESCRIPTION OF THE PREFERRED EMBODIMENTS

Figure 2:
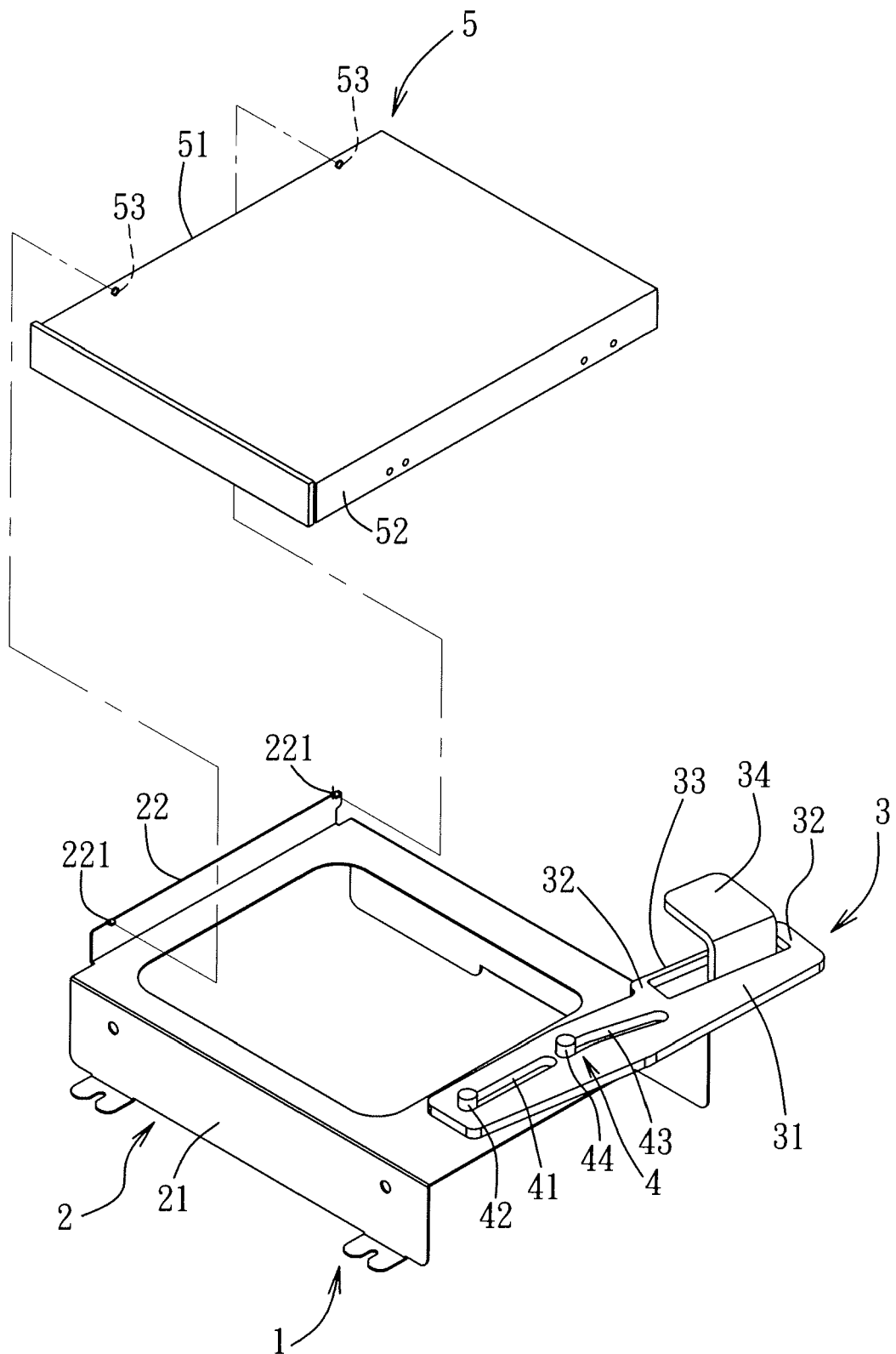
FIG. 2 is a perspective view to illustrate how the electronic device is removed from the first preferred embodiment when the abutting and retaining member of the first preferred embodiment is at a release position.

Before the present invention is described in greater detail, it should be noted that like elements are denoted by the same reference numerals throughout the disclosure.

FIGS. 1 and 2 show the first preferred embodiment of a securing device 1 according to the present invention, and an electronic device 5 mounted on the securing device 1. The electronic device 5 has one side 51 which has at least one securing hole 53.

The securing device 1 is installed in advance in a computer enclosure (not shown), and includes a body 2, an abutting and retaining member 3, and a guiding unit 4. The body 2 includes a base 21 for placement of the electronic device 5 thereon, and a lateral plate 22 extending upwardly from one side of the base 21. The lateral plate 22 has an inner side that is formed with at least one protrusion 221 for engaging the at least one securing hole 53. The number of the protrusion 221 corresponds to that of the securing hole 53. In this embodiment, the electronic device 5 has two securing holes 53 in the side 51, and the lateral plate 22 has two protrusions 221 on the inner side thereof.

The abutting and retaining member 3 is provided movably and slidably on an upper surface of the base 21. The abutting and retaining member 3 and the lateral plate 22 are located respectively on two opposite sides of the electronic device 5. The abutting and retaining member 3 includes a base portion 31, two supporting portions 32 connected to the base portion 31 and spaced apart from each other, an abutting portion 33 having two ends connected respectively to free ends of the two supporting portions 32, and a limiting portion 34 that bends and extends upwardly from the base portion 31 and that has an inverted L-shape.

Figure 3:
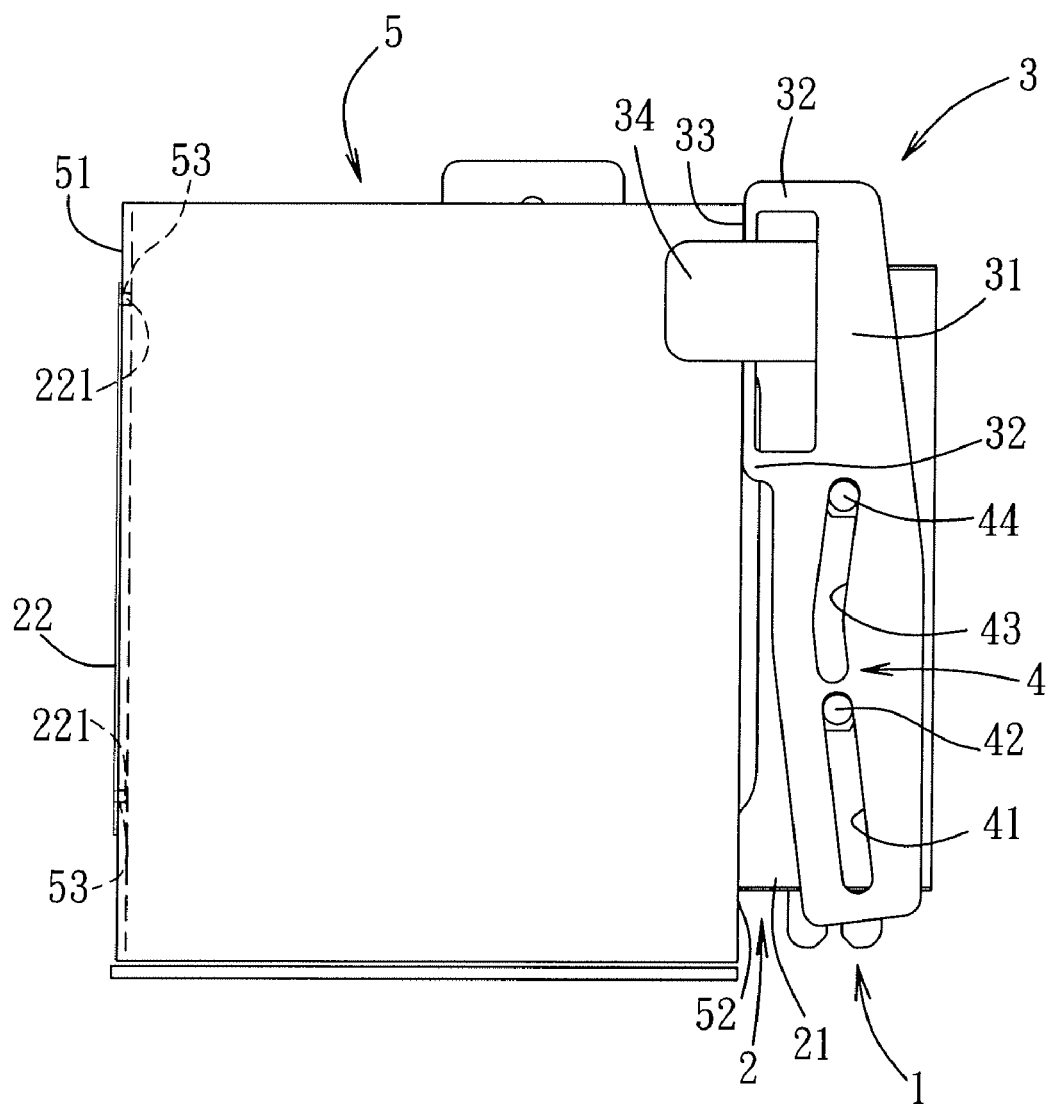
FIG. 3 is a top view of FIG. 1, illustrating the abutting and retaining member at the securing position.
Figure 4:
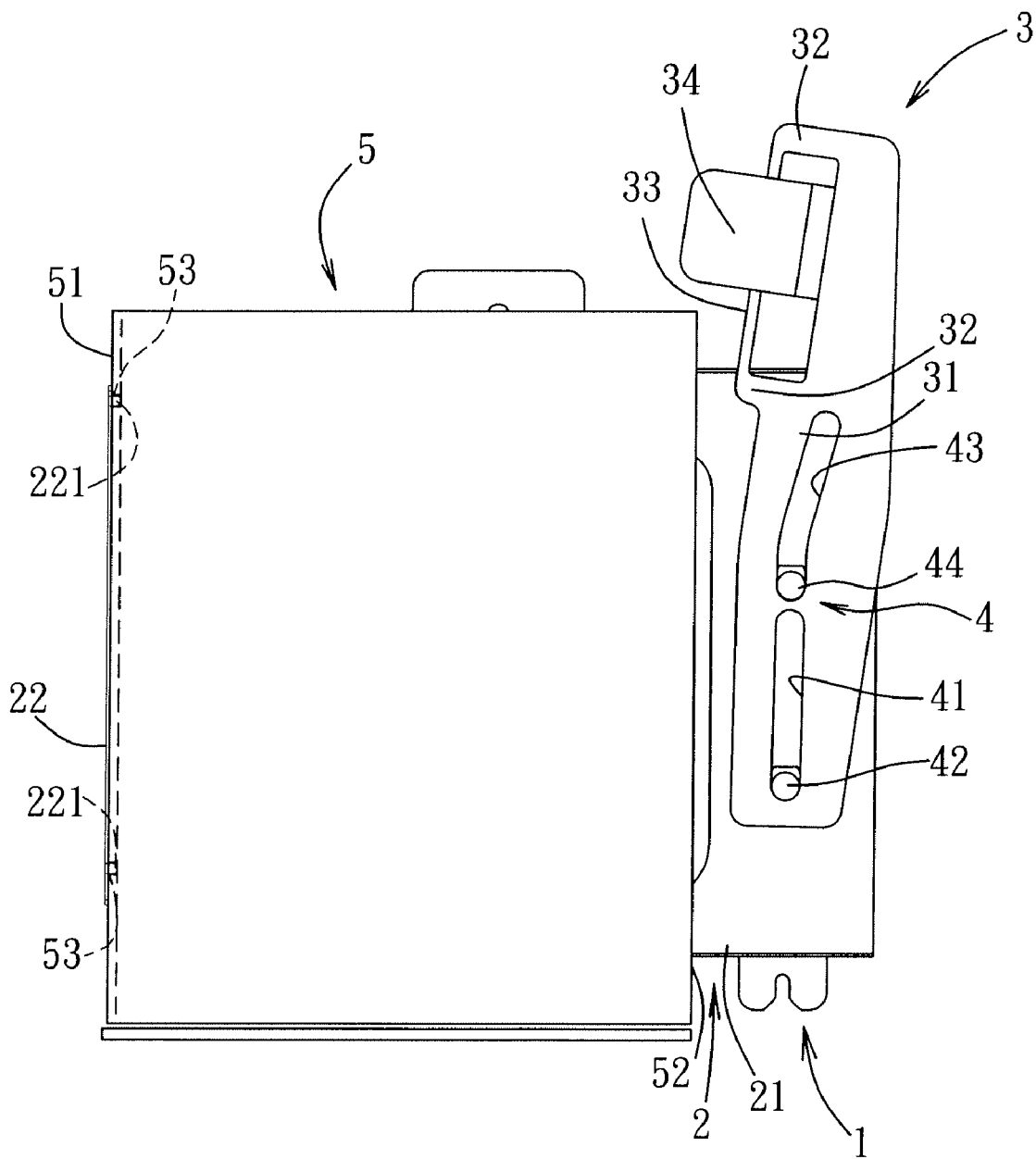
FIG. 4 is a view similar to FIG. 3, but illustrating the abutting and retaining member at the release position.

The guiding unit 4 is connected to the abutting and retaining member 3 and the base 21, and is capable of guiding the abutting and retaining member 3 to displace between a release position (as shown in FIG. 4) and a securing position (as shown in FIG. 3) relative to the base 21. In this embodiment, the guiding unit 4 includes a first guide slot 41 formed in the abutting and retaining member 3, a first guide post 42 formed on the base 21 and slidable along the first guide slot 41, a second guide slot 43 formed in the abutting and retaining member 3, and a second guide post 44 formed on the base 21 and slidable along the second guide slot 43. The first guide slot 41 extends along a direction that forms an acute angle with a direction of extension of the second guide slot 43, and the first and second guide slots 41, 43 are not intercommunicated in this embodiment.

Since the extension direction of the first guide slot 41 forms an acute angle with the extension direction of the second guide slot 43, the abutting and retaining member 3 will rotate relative to the base 21 while displacing.

It is noted that, although the first guide slot 41 and the second guide slot 43 are both located in the abutting and retaining member 3, and the first guide post 42 and the second guide post 44 are both disposed on the base 21 in this embodiment, the positions of the first guide slot 41, the second guide slot 43, the first guide post 42, and the second guide post 44 are not limited thereto in other embodiments of this invention. So long as the first guide slot 41 is formed in one of the base 21 and the abutting and retaining member 3 and the first guide post 42 is formed on the other of the base 21 and the abutting and retaining member 3, and so long as the second guide slot 43 is formed in one of the base 21 and the abutting and retaining member 3 and the second guide post 44 is formed on the other of the base 21 and the abutting and retaining member 3, the abutting and retaining member 3 can be guided to displace relative to the base 21 by the guiding unit 4.

Referring to FIG. 4, at the release position, the side 51 of the electronic device 5 with the securing holes 53 can be brought to rest against the lateral plate 22 of the securing device 1 to cause the securing holes 53 to respectively engage the protrusions 221. At this time, the other side 52 of the electronic device 5 which is opposite to the side 51 has yet to be secured by the abutting and retaining member 3. The abutting and retaining member 3 can be guided to displace to the securing position by the guiding unit 4, and the abutting and retaining member 3 can be rotated in a counterclockwise direction relative to the base 21 during the process of displacement so as to be partially close to the electronic device 5.

Referring to FIG. 3, at the securing position, the abutting and retaining member 3 is partially close to the electronic device 5, with the abutting portion 33 abutting against the side 52 of the electronic device 5 which is opposite to the side 51 with the securing holes 53, and with the limiting portion 34 resting on a top face of the electronic device 5. At this time, since the side 51 of the electronic device 5 is secured through the interengagement between the securing holes 53 and the protrusions 221, and since the abutting portion 33 of the abutting and retaining member 3 abuts against the other side 52 of the electronic device 5 and provides a pushing force thereagainst, the electronic device 5 can be steadily secured on the securing device 1.

It is noted that, since the abutting portion 33 of the abutting and retaining member 3 is connected to the base portion 31 via the two supporting portions 32, the abutting portion 33 is vested with a degree of resilience so that it is capable of slight deformation, whereby the abutting portion 33 can push against the electronic device 5 with a more steady force.

Figure 5:
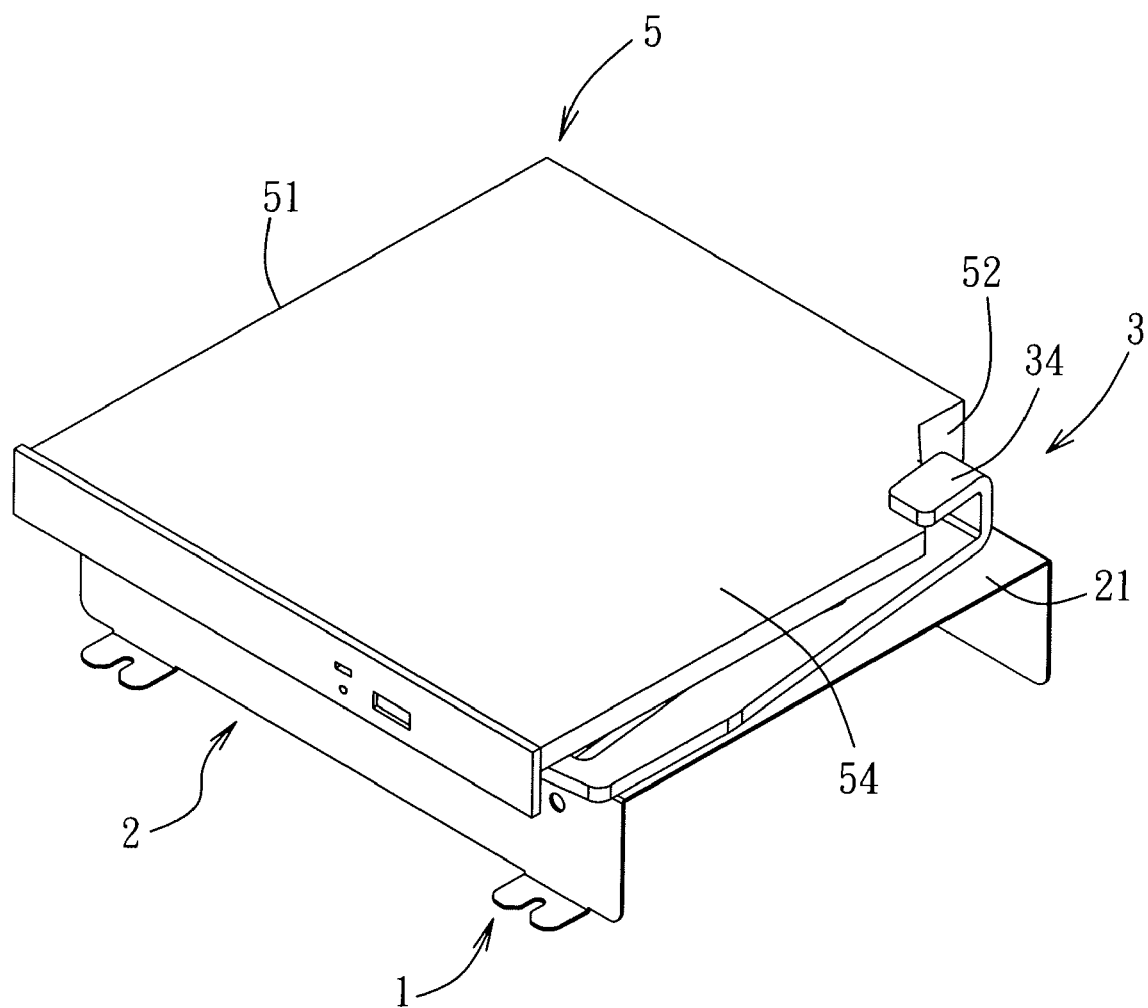
FIG. 5 is a perspective view to illustrate how an electronic device is mounted on the second preferred embodiment of a securing device according to the present invention when an abutting and retaining member of the second preferred embodiment is at a securing position.
Figure 6:
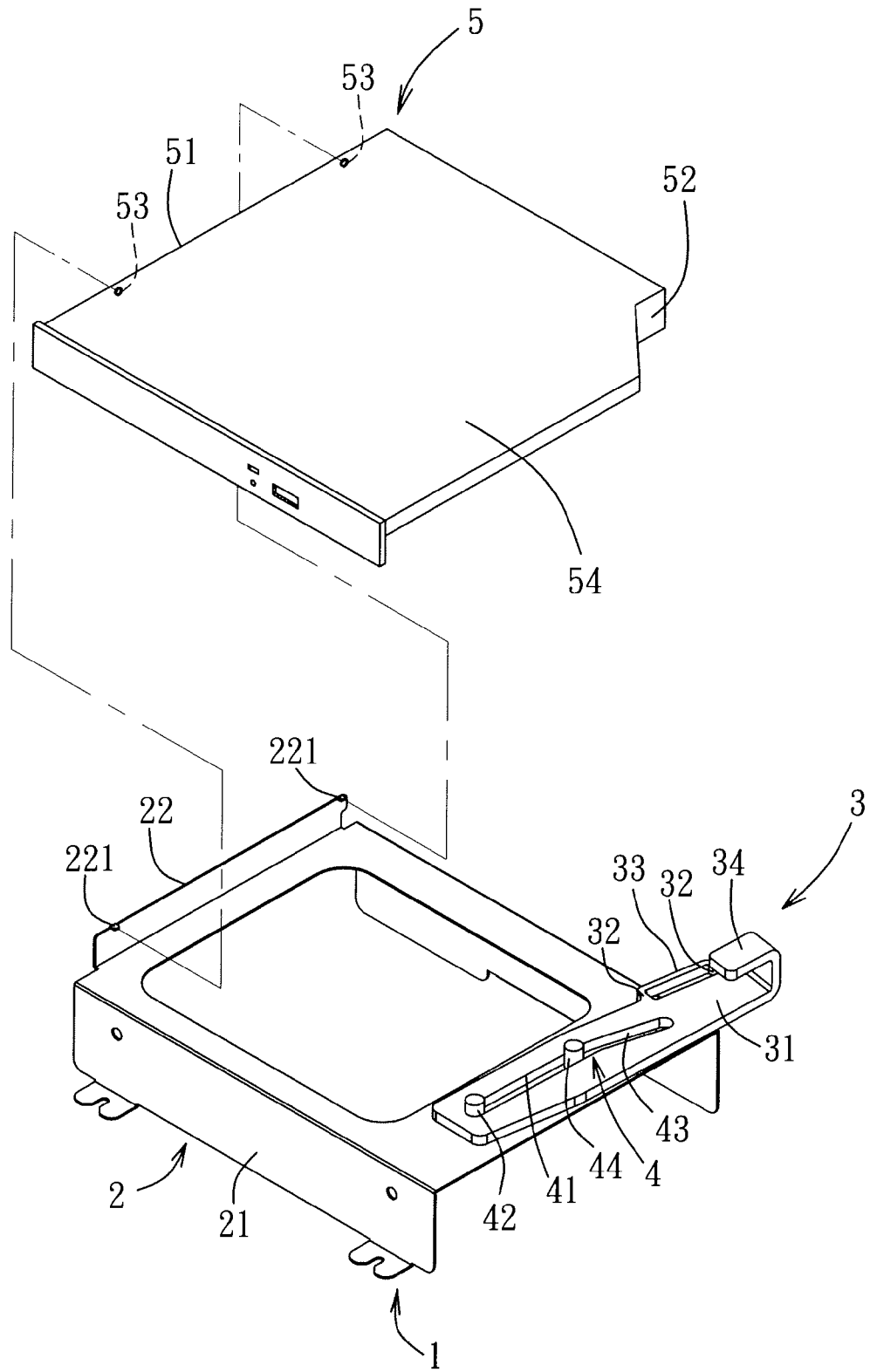
FIG. 6 is a perspective view illustrating how the electronic device is removed from the second preferred embodiment when the abutting and retaining member is at a release position.

FIGS. 5 and 6 show the second preferred embodiment of a securing device 1 according to the present invention and an electronic device 5 mounted on the securing device 1. There are two differences between the first and second preferred embodiments. The first difference is that, in this embodiment, the electronic device 5 has a projecting piece 54 extending outwardly from the side 52, and the limiting portion 34 of the abutting and retaining member 3 is connected to the base portion 31 at a different position. Thus, when the abutting and retaining member 3 is at the securing position, the limiting portion 34 can rest on a top face of the projecting piece 54. The second difference is that the first and second guide slots 41, 43 in the abutting and retaining member 3 in this embodiment are intercommunicated.

Since the operation of the second preferred embodiment is similar to that of the first preferred embodiment, further details thereof are omitted herein for the sake of brevity.

In sum, by virtue of the configuration of the abutting and retaining member 3 which has apart thereof brought into close proximity to the electronic device 5 and which abuts against the side 52 of the electronic device 5 that is opposite to the side 51 with the securing holes 53 when guided to displace from the release position to the securing position by the guiding unit 4, the electronic device 5 can be secured with the use of a simple structure that is easy to manipulate.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A securing device comprising:
a body including a base, and a lateral plate extending upwardly from one side of said base, said lateral plate having at least one protrusion formed on an inner side thereof;
an abutting and retaining member movably and slidably disposed on an upper surface of said base and spaced apart from said lateral plate; and
a guiding unit connected to said abutting and retaining member and said base, and including
a first guide slot formed in one of said base and said abutting and retaining member,
a first guide post formed on the other of said base and said abutting and retaining member and slidable along said first guide slot, a second guide slot formed in one of said base and said abutting and retaining member, and a second guide post formed on the other of said base and said abutting and retaining member and slidable along said second guide slot, said guiding unit guiding displacement of said abutting and retaining member such that said abutting and retaining member is rotatable relative to said base to be closer to said lateral plate when said abutting and retaining member is displaced from a release position to a securing position.

2. The securing device of claim 1, wherein said first and second guide slots are located in said abutting and retaining member, and said first and second guide posts are located at said base.

3. The securing device of claim 2, wherein said first and second guide slots are intercommunicated.

4. The securing device of claim 1, wherein said first guide slot extends in a direction that forms an acute angle with a direction of extension of said second guide slot.

5. The securing device of claim 4, wherein said first and second guide slots are intercommunicated.

6. The securing device of claim 1, wherein said abutting and retaining member includes a base portion, two supporting portions connected to said base portion and spaced apart from each other, and an abutting portion having two ends connected respectively to free ends of said supporting portions.

7. The securing device of claim 6, wherein said abutting and retaining member further includes a limiting portion bending and extending upwardly from said base portion.

8. An assembly comprising:
an electronic device having one side provided with at least one securing hole; and
a securing device including:
a body including a base for placement of said electronic device thereon, and a lateral plate extending upwardly from one side of said base and having an inner side formed with at least one protrusion that corresponds to said securing hole in number, said one side of said electronic device with said at least one securing hole being brought to abut against said lateral plate to permit engagement between said at least one protrusion and said at least one securing hole;
an abutting and retaining member movably and slidably disposed on an upper surface of said base, and located at the other side of said electronic device opposite to said lateral plate; and
a guiding unit connected to said abutting and retaining member and said base, and including
a first guide slot formed in one of said base and said abutting and retaining member,
a first guide post formed on the other of said base and said abutting and retaining member and slidable along said first guide slot,
a second guide slot formed in one of said base and said abutting and retaining member, and
a second guide post formed on the other of said base and said abutting and retaining member and slidable along said second guide slot,
said guiding unit guiding displacement of said abutting and retaining member such that said abutting and retaining member is rotatable relative to said base to be partially close to said electronic device and to abut against the other side of said electronic device that is opposite to said one side with said at least one securing hole when said abutting and retaining member is displaced from a release position to a securing position.

9. The assembly of claim 8, wherein said first and second guide slots are located in said abutting and retaining member, and said first and second guide posts are located at said base.

10. The assembly of claim 9, wherein said first guide slot extends in a direction that forms an acute angle with a direction of extension of said second guide slot.

11. The assembly of claim 10, wherein said first and second guide slots are intercommunicated.

12. The assembly of claim 9, wherein said first and second guide slots are intercommunicated.

13. The assembly of claim 8, wherein said abutting and retaining member includes a base portion, two supporting portions connected to said base portion and spaced apart from each other, and an abutting portion having two ends connected respectively to free ends of said supporting portions, said abutting portion abutting against the other side of said electronic device when said abutting and retaining member is at the securing position.

14. The assembly of claim 13, wherein said abutting and retaining member further includes a limiting portion bending and extending upwardly from said base portion, said limiting portion resting on a top face of said electronic device when said abutting and retaining member is at the securing position.

15. The assembly of claim 14, wherein said electronic device further has a projecting piece extending outwardly from the other side of said electronic device, said limiting portion resting on a top face of said projecting piece when said abutting and retaining member is at the securing position.

\* \* \* \* \*